| (12) | United States Patent | (10) Patent No.: | US 8,514,481 B2 |
|---|---|---|---|
| | Yeo et al. | (45) Date of Patent: | Aug. 20, 2013 |

(54) DUAL COLOR ELECTRONICALLY ADDRESSABLE INK

(75) Inventors: Jong-Souk Yeo, Incheon (KR); Igal Berson, Lod (IL); Gil Bar-Haim, Holon (IL); Yaron Grinwald, Meitar (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 285 days.

(21) Appl. No.: 13/181,479

(22) Filed: Jul. 12, 2011

(65) Prior Publication Data

US 2013/0016420 A1   Jan. 17, 2013

(51) Int. Cl.
*G02B 26/00* (2006.01)
*G09G 3/34* (2006.01)

(52) U.S. Cl.
USPC ............ 359/296; 345/107; 106/400; 106/401

(58) Field of Classification Search
USPC ................... 359/296, 85, 107; 106/400, 401, 106/31.13, 31.6
See application file for complete search history.

(56) References Cited

U.S. PATENT DOCUMENTS

| 5,047,306 | A | | 9/1991 | Almog |
|---|---|---|---|---|
| 5,225,306 | A | | 7/1993 | Almog et al. |
| 5,300,390 | A | | 4/1994 | Landa et al. |
| 5,346,796 | A | | 9/1994 | Almog |
| 5,360,689 | A | * | 11/1994 | Hou et al. ........................ 430/34 |
| 5,393,635 | A | | 2/1995 | Russell et al. |
| 5,407,771 | A | * | 4/1995 | Landa et al. ................ 430/110.1 |
| 5,554,476 | A | | 9/1996 | Landa et al. |
| 5,759,733 | A | * | 6/1998 | Tsubuko et al. .............. 430/115 |
| 5,792,584 | A | * | 8/1998 | Almog ...................... 430/137.22 |
| 5,935,754 | A | * | 8/1999 | Almog ........................ 430/119.5 |
| 6,067,185 | A | * | 5/2000 | Albert et al. .................... 359/296 |
| 6,117,368 | A | * | 9/2000 | Hou ............................... 252/572 |
| 6,623,902 | B1 | | 9/2003 | Ben-Avraham et al. |
| 6,956,690 | B2 | | 10/2005 | Yu et al. |
| 7,193,769 | B2 | | 3/2007 | Yang et al. |
| 7,903,319 | B2 | | 3/2011 | Honeyman et al. |
| 8,356,752 | B2 | * | 1/2013 | Grinwald et al. ............. 235/451 |
| 2002/0102487 | A1 | | 8/2002 | Almog |
| 2006/0079603 | A1 | * | 4/2006 | Sato et al. ...................... 523/160 |
| 2008/0266245 | A1 | | 10/2008 | Wilcox et al. |
| 2008/0273237 | A1 | | 11/2008 | Baesjou et al. |
| 2009/0311614 | A1 | | 12/2009 | Almog et al. |
| 2010/0079358 | A1 | | 4/2010 | Daniel et al. |
| 2010/0328758 | A1 | | 12/2010 | Sikharulidze et al. |
| 2011/0261435 | A1 | * | 10/2011 | Grinwald et al. ............. 359/296 |

FOREIGN PATENT DOCUMENTS

| WO | PCT/EP2010/052988 | 3/2010 |
|---|---|---|
| WO | WO 2010/077238 | 7/2010 |
| WO | WO 2010/077239 | 7/2010 |

OTHER PUBLICATIONS

U.S. Appl. No. 12/815,811, filed Jun. 15, 2010, Yeo et al.

\* cited by examiner

*Primary Examiner* — Evelyn A. Lester

(57) ABSTRACT

A dual color electronically addressable ink includes a positively charged ink and a negatively charged ink. The positively charged ink includes a non-polar carrier fluid, pigment-loaded basic resin particles having a first color, and an acceptor charge adjuvant. The negatively charged ink includes the non-polar carrier fluid, pigment-loaded acidic resin particles having a second color that is different than the first color, and a donor charge adjuvant. The dual color electronically addressable ink also includes at least one charge director.

16 Claims, 4 Drawing Sheets

DUAL COLOR ELECTRONICALLY ADDRESSABLE INK

BACKGROUND

The present disclosure relates generally to dual color electronically addressable inks.

Ink compositions including charged particles (i.e., electronic inks) are widely used, for example, as additives for plastics, in electrophotographic printing, in electrophoretic displays, and in a variety of other applications. When used in electrophoretic displays, the charged colorant particles rearrange within a viewing area of the display to produce desired images in response to an applied electric field. Many electronic inks include negatively charged particles or positively charged particles. These unidirectional charging mechanisms often limit the design of displays.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
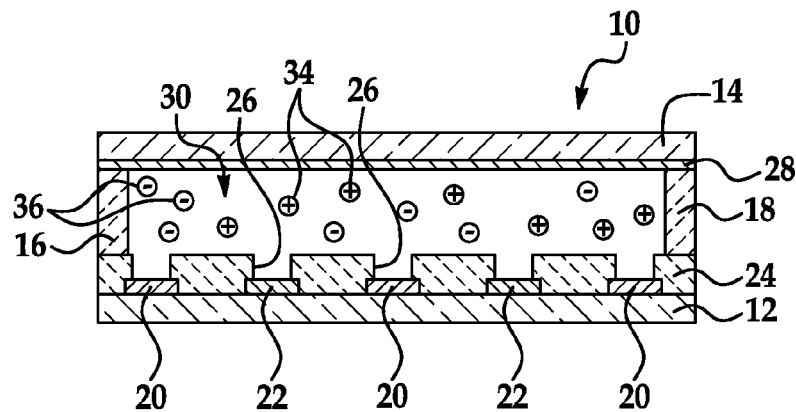
FIG. 1 is a cross-sectional view of an example of a display pixel including an example of a dual color electronically addressable ink.

In the following detailed description, directional terminology, such as "top," "bottom," "front," "back," etc., is used with reference to the orientation of the Figure(s) being described. Components of examples of the present disclosure can be positioned in a number of different orientations, and thus the directional terminology is used for purposes of illustration and is in no way limiting. It is to be understood that other examples may be utilized and structural or logical changes may be made without departing from the scope of the present disclosure. As used herein, the term "over" is not limited to any particular orientation and can include above, below, next to, adjacent to, and/or on. In addition, the term "over" can encompass intervening components between a first component and a second component where the first component is "over" the second component. Also as used herein, the term "adjacent" is not limited to any particular orientation and can include above, below, next to, and/or on. In addition, the term "adjacent" can encompass intervening components between a first component and a second component where the first component is "adjacent" to the second component.

Examples of the dual color electronically addressable ink disclosed herein include a mixture of a positively charged ink, a negatively charged ink, and one or more charge directors. The ink exhibits binary electronic activity, and is bi-stable. The ink disclosed herein is defined by the selection of resins and charge adjuvants for the positive and negative inks, and the selection of charge director(s). The components can be selected to control the charging, color depth, and colorant particle dispersion. The inks disclosed herein may be suitable for use in a variety of applications, including display applications, electronic skins, blanket jetting applications, digital printing applications, ion beam printing applications, or other printing applications.

As mentioned above, the dual color electronically addressable inks disclosed herein includes some positively charged ink, some negatively charged ink, and one or more charge directors. It is desirable that the resulting electronically addressable ink have a charge balance (i.e., positive charge equals negative charge). Without being bound to any theory, it is believed that the charges may be divided equally between the oppositely charged particles, between counter ions that are generated in solution by the oppositely charged particles, or combinations thereof. As such, obtaining the charge balance may depend, at least in part, upon the resin(s) used, the charge adjuvant(s) used, the charge director(s) used, and the chemistry that takes place within the ink.

The positively charged ink used in the dual color electronically addressable ink includes a non-polar carrier fluid, pigment-loaded basic resin particles, and an acceptor charge adjuvant. The negatively charged ink used in the dual color electronically addressable ink includes a non-polar carrier fluid, pigment-loaded acidic resin particles, and a donor charge adjuvant.

The non-polar carrier fluid selected for the positively charged ink is the same non-polar carrier fluid selected for the negatively charged ink. As such, these non-polar carrier fluids make up the carrier fluid of the dual color ink. In an example, the non-polar carrier fluid has a resistivity in excess of about 109 ohm-cm and a dielectric constant below about 5.0. Examples of suitable non-polar carrier fluids include hydrocarbons, halogenated hydrocarbons, or functionalized hydrocarbons (where functionalization can be accomplished using esters, ethers, sulfonic acids, sulfonic acid esters, and the like). The hydrocarbon may be an aliphatic hydrocarbon, an isomerized aliphatic hydrocarbon, a branched chain aliphatic hydrocarbon, an aromatic hydrocarbon, or combinations thereof. In some examples, the carrier fluids include isoparaffinic compounds, paraffinic compounds, dearomatized hydrocarbon compounds, and the like. Specific examples of suitable carriers for the positively charged ink, the negatively charged ink, and thus the dual color ink include Isopar-G™, Isopar-15 H™, Isopar-L™, Isopar-M™, IsoparK™, Isopar-V™, Norpar 12®, Norpar 13®, Norpar 15®, Exxsol D40™, Exxsol D80™, Exxsol D100™, Exxsol D130™, and Exxsol D140™ (available from Exxon Mobil Corp.); Teclen N-16™, Teclen N-20™, Teclen N-22™, Nisseki Naphthesol L™ Nisseki Naphthesol M™, Nisseki Naphthesol H™, Solvent L™, Solvent M™ Solvent H™, Nisseki Isosol 300™, Nisseki Isosol 400™, AF-4™, AF-5™, AF-6™ and AF-7™ (available from Nippon Oil Corp.); IP Solvent 1620™ and IP Solvent 2028™ (available from Idemitsu Kosan); and Electron™, Positron™, and New II™ (available from Ecolink). In some examples, each of the positively charged ink and negatively charged ink includes the carrier fluid in an amount ranging from about 15 wt % to about 99 wt % by total weight of the respective ink composition. The amount of carrier fluid in the dual ink depends upon how much of each of the positively charged ink and negatively charged ink is utilized.

The pigment-loaded basic resin particles of the positively charged ink are particles that include at least a pigment and a basic resin polymer. The pigment-loaded acidic resin particles of the negatively charged ink are particles that include at least a pigment and an acidic resin polymer. The pigment-loaded basic and acidic resin particles may be formed using a grinding process, such as that described in U.S. Pat. No. 6,623,902. With this type of process, the starting materials are the respective pigment particles and the respective resin particles, as opposed to resin precursor materials used in other pigment encapsulation processes. The grinding of the respective pigment particles and respective resin particles may be accomplished using a grinding mill or ball mill which reduces the size of the resin particles. Processing the respective pigment particles and the respective resin particles together disperses the respective pigment particles among, and loads the respective pigment particles on the respective resin particles. The resulting particles are composite particles where the pigments are embedded in and highly dispersed in the solid resin particles. As a result of grinding, each of the pigment-loaded basic resin particles and the pigment-loaded acidic resin particles exhibits an average particle size that is less than 3 microns. In other instances, the average particle size of each of the pigment-loaded basic resin particles and the pigment-loaded acidic resin particles is less than 2 microns, or less than 1 micron. In some instances, the average particle size may be as small as 0.25 microns (i.e., range is from about 0.25 microns to about 3 microns), and in other instances, the average particle size may be as small as 0.1 microns (i.e., range is from about 0.1 microns to about 3 microns). In one example, the average particles size is about 0.37 microns.

The basic resin that may be used to form the pigment-loaded basic resin particles of the positively charged ink is any resin that has the capacity of attracting protons (H+). In some examples, the basic resin may exhibit a weight average molecular weight ranging from about 500 to about 20,000. In other examples, the basic resin has a weight average molecular weight ranging from about 1,000 to about 5,000.

Examples of suitable basic resins include polyamines, polyamides, a homopolymer or a copolymer of polyvinyl pyrrolidone, a vinyl pyrrolidone/triacontene copolymer (i.e., a copolymer of vinylpyrrolidone grafted with triacontene), and polyvinyl pyridine polymers or copolymers. Polyvinyl pyrrolidone copolymers may be formed via the polymerization of monomers with vinyl pyrrolidone. Examples of monomers that can be polymerized with vinyl pyrrolidone to form the polyvinyl pyrrolidone copolymers include alkyl-methacrylates-acrylates (e.g., butylmethacrylates, methylmethacrylates and the like). Some examples of polyvinyl pyrrolidones include styrene/butylmethacrylate/vinyl pyrrolidone terpolymers, vinyl pyrrolidone/vinyl acetate copolymers, vinyl pyrrolidone homopolymers, and the like. One example of the vinyl pyrrolidone/triacontene copolymer is 2-pyrrolidinone 1-ethenyl triacontene polymer. Examples of suitable polyvinyl pyridine copolymers include polyvinyl pyridine co-styrene or polyvinyl pyridine co-butyl methacrylate. The basic resin may also be an amino terminated polyacrylate, such as poly(t-butyl amino ethyl methacrylate) or poly(dimethyl amino ethyl methacrylate). In other examples, the basic resin is a polymer or copolymer selected from polyethylene imine; polyethylene oxide diamine terminated; polypropylene oxide, monoamine or di-amine terminated; polydimethyl siloxane diamino propyl terminated; ethylene/butylene copolymer mono and dihydroxy terminated; and hydroxylethyl cellulose. One specific example of a commercially available basic resin includes Antaron-Ganex® WP-660 wax resin, a copolymer available from International Specialty Products.

The basic resin is present in the positively charged ink in an amount ranging from about 1 wt % to about 99 wt % of the total amount of solids (i.e., total weight of non-volatile substances) present in the positively charged ink composition. In some examples, the resin loading may represent from about 25 wt % to about 80 wt %, or from about 35 wt % to about 70 wt %.

Since the charge and performance of the pigment-loaded basic resin particles are based, at least in part, on the resin that is selected and are partially ($2^{nd}$ order effect) independent of the pigment chemistry, any suitable pigment may be utilized to form the pigment-loaded basic resin particles. In some examples, the resins include the property of being compatible with a cyan pigment, a magenta pigment, a yellow pigment, a black pigment, and combinations thereof. Such compatibility allows tuning or adjustment of the color gamut since the resin exhibits compatibility with combinations of pigments. Individual pigment-loaded basic resin particles may include more than one of the CMYK pigments and/or other base or secondary pigments and may exhibit any color from various pigment combinations, such as, any color within the available Pantone spot color space. Thus, in some examples, the pigments are cyan pigments, magenta pigments, yellow pigments, black pigments or any combinations thereof.

Examples of suitable pigments for the pigment-loaded basic resin particles are Mogul® L (Cabot, pigment black), Monastral Blue G (C.I. Pigment Blue 15, C.I. No. 74160), Quindo® Magenta (Mobay Chemical Co., Pigment Red 122), Indo Brilliant Scarlet Toner (Pigment Red 123, C.I. No. 71145), Dalamar® Yellow (Clariant AG Corp., Pigment Yellow 74, C.I. No. 11741), blue pigment BT-383D (DuPont), yellow pigment YT-10 717D (DuPont), red pigment RT-455D (DuPont), blue pigment Helioecht™ Blue GO (Bayer), and Paliotol® yellow D1155 (BASF).

The pigment is present in the positively charged ink in an amount ranging from about 1 wt % to about 99 wt % of the total amount of solids (i.e., total weight of non-volatile substances) present in the positively charged ink composition. In some examples, the pigment loading may represent from about 10 wt % to about 90 wt %, from about 20 wt % to about 75 wt %, or from about 30 wt % to about 65 wt %.

The positively charged ink also includes an acceptor charge adjuvant. When forming the pigment-loaded basic resin particles, the acceptor charge adjuvant may be added during the grinding process. This causes the charge adjuvant to become part of the resin composition, by virtue of chemical bonding or physical association. In one example, the acceptor charge adjuvant includes an acid moiety that binds to the basic resin. The acceptor charge adjuvant also provides a molecular structure to trap charge director molecules (e.g., a donor charge director) around the pigment-loaded basic resin particles. For example, the acceptor charge adjuvant also includes an electron accepting moiety (e.g., a Lewis acid) that interacts with a positive charge director to enhance the positive charge. As such, the acceptor charge adjuvant enhances the binding and/or activation of the charge director and thus increases the positive particle conductivity. Without being limited to any particular theory, it is believed that an equilibrium exists between free charge and the charge director physically associated with the particles, and the equilibrium is exhibited in the particle conductivity. The additional acceptor groups of the acceptor charge adjuvant also enhance the positive charge on the pigment-loaded basic resin particles.

Examples of the acceptor charge adjuvant have the formula $X_n(R^a)(R^b)$ or $X_n(R^a)(R^b)(COOH)$ where X is F, Cl, Br, $NO_2$ or CN; $R^a$ is a substituted or unsubstituted alkyl group; $R^b$ is Sb, P, Ti, Sn, B, Al, Zn, or an aromatic group; and n is 1, 2, 3, 4 or 5. One example of the acceptor charge adjuvant has the formula $Cl_n(R^a)(R^b)(COOH)$, where $R^a$ is a substituted or unsubstituted alkyl group having 3, 4 or 5 carbon atoms, $R^b$ is a benzene or a phenol group, and n is 1 or 2. Another example of the acceptor charge adjuvant is a chlorobenzene based compound, such as $Cl(R^a)(R^b)(COOH)$, where $R^a$ is an alkyl group having 5 carbon atoms and $R^b$ is a benzene group. Still another example of the acceptor charge adjuvant has $Cl_2(R^a)(R^b)(COOH)$, where $R^a$ is an alkyl group having 4 carbon atoms and $R^b$ is a phenol group. Still other examples this charge adjuvant include chloro-phenyl carboxylic acid, 2-(4-chlorophenyl)-3-methylbutyric acid, and 4-(2,4-dichlorophenoxy)butyric acid.

The term "alkyl" as used in these examples means a branched, unbranched or cyclic saturated hydrocarbon group, which may contain from 1 to 20 carbon atoms. Alkyls include, for example, methyl, ethyl, n-propyl, isopropyl, n-butyl, isobutyl, t-butyl, octyl, and decyl, as well as cycloalkyl groups, such as cyclopentyl, and cyclohexyl. The alkyl may be a lower alkyl group, which includes from 1 to 8 carbon atoms. In some examples, $R^a$ is a substituted alkyl group or a heteroalkyl alkyl group. As used herein, the term "substituted alkyl" means an alkyl substituted with one or more substituent groups; and the term "heteroalkyl" means an alkyl in which at least one carbon atom is replaced with a heteroatom.

A suitable amount of the acceptor charge adjuvant in the positively charged ink ranges from about 0.05 wt % to about 8 wt % of the total amount of solids present in the positively charged ink.

The acceptor charge adjuvant may function as a viscosity controlling agent and/or a dispersing agent. In some instances, the reaction of the acceptor charge adjuvant with the basic resin releases a dispersing agent that enhances the dispersion of the pigment particles during grinding.

The negatively charged ink of the dual color ink disclosed herein includes pigment-loaded acidic resin particles and a donor charge adjuvant. The acidic resin that may be used to form the pigment-loaded acidic resin particles of the negatively charged ink is any resin that has the capacity of accepting electron pairs. In some examples, the acidic resin may exhibit a weight average molecular weight ranging from about 1,000 to about 5,000. In other examples, the acidic resin has a weight average molecular weight ranging from about 1,000 to about 3,000.

Examples of suitable acidic resins include a copolymer of polyethylene grafted with maleic anhydride (e.g., A-C 575 wax resin available from Honeywell), or a polyethylene-based ionomer (e.g., poly(ethylene-co-acrylic acid) zinc salt). The acidic resin may also be selected from thermoplastic polymers, such as ethylene vinyl acetate copolymers sold by DuPont under the ELVAX trademark, and ELVAX II resins which are ethylene copolymers combining carboxylic acid functionality, high molecular weight, and thermal stability. Other suitable acidic resins include isotactic polypropylene (crystalline), polybutyl terephthalate, the ethylene ethyl acrylate series sold by Union Carbide under the trademark BAKELITE, other ethylene vinyl acetate resins (e.g., Union Carbide's DQDA 6479 Natural 7 and DQDA 6832 Natural 7), methacrylate resins (e.g., polybutyl methacrylate, polyethyl methacrylate, and polymethyl methacrylate), and polyvinyl chloride.

It has been observed that acid groups in resin may invoke hydrogen bond cross-linking, making particle size reduction less effective. In the presence of acid group cross-linking via hydrogen bonds, difficulty may be encountered in producing resin particles exhibiting an average particle size less than 1 micron. Techniques for overcoming hydrogen bonding are available, one example of which is described herein.

Copolymers of polyethylene grafted with maleic anhydride and poly(ethylene-co-acrylic acid) zinc salt include blocked acid groups. In the copolymer including maleic anhydride, maleic acid groups are blocked by the existence of the anhydride. Maleic acid groups may become unblocked by hydrolysis, providing an acidic surface. Hydrolysis may be accomplished with the addition of water, for example, during an appropriate phase in particle size reduction, such as before adding the donor charge adjuvant. In the copolymer including acrylic acid salt, acrylic acid groups are blocked by reaction with a metal base, specifically a zinc base, to produce a metal salt. Acrylic acid groups may become unblocked by dissociation of the metal ion. Dissociation may be accomplished with the addition of a solvent, for example, during an appropriate phase in particle size reduction or thereafter, e.g., when adding the carrier fluid. The presence of ionic acid groups bound to a metal ion in the salt increases polarity of the resin and enhances charging.

Other blocking/unblocking schemes relying on the same types of chemical bonds or other types of chemical bonds, such as partial esterification of acid groups are also believed to be suitable. In one example, some of the acid groups of a resin are blocked while other acid groups are not blocked, and in another example, all of the acid groups of a resin are blocked.

In addition, a viscosity control agent and/or a charge adjuvant may react with acid groups to provide the benefits described herein. By using resins with blocked acid groups, particle size reduction may proceed with less hindrance while still providing acid groups for producing negatively charged particles.

The acidic resin is present in the negatively charged ink in an amount ranging from about 1 wt % to about 99 wt % of the total amount of solids (i.e., total weight of non-volatile substances) present in the negatively charged ink composition. In some examples, the resin loading may represent from about 25 wt % to about 80 wt %, or from about 35 wt % to about 70 wt %.

Since the charge and performance of the pigment-loaded acidic resin particles are based, at least in part, on the resin that is selected and are independent of the pigment chemistry, any suitable pigment may be utilized to form the pigment-loaded acidic resin particles. In some examples, the resins include the property of being compatible with a cyan pigment, a magenta pigment, a yellow pigment, a black pigment, and combinations thereof. Such compatibility allows tuning or adjustment of the color gamut since the resin exhibits compatibility with combinations of pigments. Individual pigment-loaded acidic resin particles may include more than one of the CMYK pigments and/or other base or secondary pigments and may exhibit any color from various pigment combinations, such as, any color within the available Pantone spot color space. Thus, in some examples, the pigments are cyan pigments, magenta pigments, yellow pigments, black pigments or any combinations thereof. Any of the previously listed pigments may be used to form the pigment-loaded acidic resin particles.

The pigment is present in the negatively charged ink in an amount ranging from about 1 wt % to about 99 wt % of the total amount of solids (i.e., total weight of non-volatile substances) present in the negatively charged ink composition. In some examples, the pigment loading may represent from about 10 wt % to about 90 wt %, from about 20 wt % to about 75 wt %, or from about 30 wt % to about 65 wt %.

The negatively charged ink also includes a donor charge adjuvant. When forming the pigment-loaded acidic resin particles, the donor charge adjuvant may be added during the grinding process. This causes the charge adjuvant to become part of the resin composition, by virtue of chemical bonding or physical association. In one example, the donor charge adjuvant includes a base moiety that binds to the acidic resin. The donor charge adjuvant also provides a molecular structure to trap charge director molecules (e.g., acceptor charge director) around the pigment-loaded acidic resin particles. For example, the donor charge adjuvant also includes an electron donating moiety (e.g., a Lewis base or an organo-Lewis base) that interacts with a negative charge director to enhance the negative charge. As such, the donor charge adjuvant enhances the binding and/or activation of the charge director and thus increases the negative particle conductivity. Without being limited to any particular theory, it is believed that an equilibrium exists between free charge and the charge director physically associated with particles, and the equilibrium is exhibited in the particle conductivity. When aluminum tristearate is used as the donor charge adjuvant, it is hypothesized that the equilibrium shifts to a lower volume of free charge, increases charge director association with the particles, and enhances particle conductivity. The additional electron donating groups of the donor charge adjuvant enhance the negative charge on the pigment-loaded acidic resin particles.

Examples of the donor charge adjuvant include metallic soaps containing a metal, such as Al, Zn, Ca, Mg, Y, other metals, and combinations thereof, and a ligand, such as stearate, oleate, palmitate, other ligands, and combinations thereof. Examples of metallic soaps include aluminum tristearate, aluminum distearate, polyoxo aluminum stearate (POAS), polyoxo aluminum palmitate, oxo-aluminum acrylates, Y(III) stearate, or any other metallic salt whose leaving group is capable of dissolving in the carrier fluid. Other donor charge adjuvants may be those that physically associate, but do not chemically bond, with the resin. One example includes white pigment ($TiO_2$) solids impregnated in the negative/acidic resin.

A suitable amount of the donor charge adjuvant in the negatively charged ink ranges from about 0.05 wt % to about 8 wt % of the total amount of solids present in the negatively charged ink.

The donor charge adjuvant may function as a viscosity controlling agent and/or a dispersing agent. In some instances, the reaction of the donor charge adjuvant with the acidic resin releases a dispersing agent that enhances the dispersion of the pigment particles during grinding. In one example, a copolymer of polyethylene grafted with maleic anhydride is selected as the resin and aluminum tristearate is selected as the donor charge adjuvant. Hydrolysis of the maleic anhydride releases two acid sites which can react with the aluminum atom of aluminum tristearate to release two stearic acid molecules, which act as the dispersing agent. The remaining stearic acid molecule is bound to the aluminum atom and provides a molecular structure for trapping charge director molecules.

Additional dispersing agent(s) and/or viscosity controlling agents may be added to either the negatively charged ink or the positively charged ink.

The dual color ink includes some of the previously described positively charged ink mixed together with some of the previously described negatively charged ink. Each of the positively charged ink and the negatively charged ink may be present in an amount ranging from about 0.1 wt % to about 10 wt % of a total wt % of the dual color ink. In one example, each of the inks is present in the dual color ink in an amount ranging from 2 wt % to about 7 wt %. As such, the dual color ink includes carrier fluid, pigment-loaded basic resin particles associated with the acceptor charge adjuvant, and pigment-loaded acidic resin particles associated with the donor charge adjuvant.

The dual color ink also includes one or more charge directors. The charge director(s) are specifically selected to achieve electronic binary activity.

Charge director(s) are components that induce and/or increase the charge on the respective resin particles. The charge directors can physically associate with the pigment-loaded basic resin particles and/or the pigment-loaded acidic resin particles. The selected charge director(s) may form a micelle (or a reverse micelle) structure physically associated, but not chemically associated, by hydrophobic bonding with the resin particles to provide at least part of the particle charge. Hydrophobic bonding or, more appropriately, hydrophobic interaction represents a well-known phenomenon that occurs in micellular structures. Essentially, a reverse micelle forms in the non-polar carrier fluid when the hydrophilic heads of the amphiphilic molecules orient the molecules so as to assemble the hydrophilic heads together inside the micelle with hydrophobic tails assembled outside at the micelle surface. The charge director forms a reverse micelle structure that physically associates by hydrophobic bonding with the resin particles to provide at least part of the particle charge. Hydrophobic bonding is also well-known, and does not infer chemical bonding, but rather an attractive physical interaction between hydrophobic portions of molecules and a non-polarized material, such as the resin surface.

Depending upon the charge director that is selected, the reverse micelle that is formed may be a positively charged micelle or a negatively charged micelle. Some charge directors are capable of forming positively charged micelles, negatively charged micelles, or both the positively charged micelles and the negatively charged micelles. As such, some charge directors are capable of associating with the pigment-loaded basic resin particles (enhancing the positive charge), some other charge directors are capable of associating with the pigment-loaded acidic resin particles (enhancing the negative charge), and still some other charge directors are capable of associating with both the pigment-loaded basic or the acidic resin particles (enhancing both the positive and negative charges).

In one example, the charge director selected is capable of forming both positive and negative micelles, thus enhancing both the positive charge and the negative charge of the respective pigment-loaded resins. In one example, this type of charge director is a bivalent dispersant that is soluble in the non-polar solvent and can polar end groups at both ends. Examples of this type of charge director include polyisobutylene succinimide polyamine polymers (e.g., OLOA® 1200, OLOA® 11000, or other OLOA® compounds from Chevron Oronite and LUB 6406 from Lubrizol). When this dual acting charge director is added to the dual color ink, it is to be understood that additional charge directors may not be included. This charge director may be present in the dual color ink in an amount that ranges from about 1% to about 500% of the total solids present in the dual color ink. In other examples, the amount of this charge director ranges from about 10% to about 200% of the total solids, or from about 50% to about 200% of the total solids.

In another example, the dual colored ink includes a positive charge director (capable of forming positively charged micelles) and a negative charge director (capable of forming negatively charged micelles). When used together in the dual color ink, the positive charge director and the negative charge director may be used in equal or non-equal amounts. The amount of each charge director will depend, at least in part, on the other ink components (e.g., the resins used and the charge adjuvants used). It is desirable that the dual color ink have a charge balance, and thus the amount of each of the positive and negative charge directors will depend upon the other materials that are used and potentially any counter ions that may be generated in solution. In one example, based upon the total wt % of solids in the dual color ink, about 2 wt % the negative charge director may be included and about 5 wt % of the positive charge director may be included.

Examples of positive charge directors include organic multi-valent metal surfactant salts. These organic salts are soluble in the non-polar carrier, for example, at room temperature. In one example, the organic multi-valent metal salt includes polyvalent metal ions, and organic anions as the counterion. Examples of suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), Ta(V), and Ti(IV). Examples of suitable organic anions include carboxylates or sulfonates derived from aliphatic or aromatic carboxylic or sulfonic acids.

Other specific examples of positive charge directors include manganese naphthenate, manganese octoate, zirconium octoate, cobalt octoate, iron naphthenate, magnesium octoate, titanium(IV)-2-ethyl-1,3 hexanediolate, titanium (IV)-2-ethylhexyloxide, zirconium(IV)-ter-butoxide, tantalum(V)-butoxide, poly-oxo-aluminum tristearate, zinc naphthenate, barium distearate and calcium stearate. In one example, the positive charge director is zirconium(IV) octoate or 2-ethyl hexanoate. In another example, the positive charge director is zirconium(IV) 2-ethyl hexanoate (i.e., ZZ11).

In some instances, polyisobutylene succinimide polyamines may be used as the positive charge director. One example includes OLOA®1200 (available from Chevron Oronite).

Any suitable negative charge director may be selected. The organic multi-valent metal surfactant salts and polyisobutylene succinimide polyamines previously discussed may also be used as negative charge directors. Other examples of the negative charge director include metal salts of fatty acids; metal salts of sulfo-succinates; metal salts of oxyphosphates; metal salts of alkyl-benzenesulfonic acid; metal salts of aromatic carboxylic acids or sulfonic acids; polyoxyethylated alkylamines; lecithin; polyvinyl-pyrrolidone; and/or organic acid esters of polyvalent alcohols.

Humidity tolerant charge directors may also be used. The humidity tolerant negative charge directors include a molecular charge director compound and an ionic charge director compound, each being conjugated to a polymer which is insoluble in the non-polar carrier fluid. Examples of these humidity tolerant charge directors are described in U.S. Pat. No. 5,047,306, entitled "Humidity Tolerant Charge Director Compositions", which is incorporated herein by reference.

Other suitable negative charge directors include a stabilizing component and exhibit suitable charge recovery. Examples of these charge director compositions are described in U.S. Pat. No. 5,345,796, entitled "Electrically Stabilized Liquid Toners", which is incorporated herein by reference.

The negative charge director may also be a synthetic material including (a) nanoparticles of a simple salt and (b) a sulfosuccinate salt of the general formula $MA_n$, wherein M is a metal, n is the valence of M, and A is an ion of the general formula $R_1$—O—C(O)CH$_2$CH(SO$_3^-$)C(O)—O—$R_2$], (I) wherein each of $R_1$ and $R_2$ is an alkyl group. Examples of this synthetic negative charge director are described in U.S. Patent Publication No. 2009/0311614, entitled "Charge Director for Liquid Toner", which is incorporated herein by reference.

The negative charge director may also include a very weakly associating, charged functional group that covalently bonds to the acidic resin and a very strongly chelating, neutrally charged, molecule that disperses in the liquid phase. Examples of this negative charge director are described in U.S. Pat. No. 5,393,635, entitled "Chelating Negative Charge Director for Liquid Electrophotographic Toner", which is incorporated herein by reference.

Another specific example of the negative charge director is sulfosuccinic acid, ditridecyl ester metal salt, where the metal salt is barium salt.

In one example of the dual color ink using both a positive charge director and a negative charge director, the positive charge director is zirconium(IV) octoate (e.g., ZZ11) and the negative charge director is sulfosuccinic acid, ditridecyl ester barium salt. In this example, about 15 wt % (based on solids) of zirconium(IV) octoate is included and about 10 wt % (based on solids) of sulfosuccinic acid, ditridecyl ester metal salt is included.

The bulk of the dual color ink is made up of the non-polar solvent used in the positively and negatively charged inks.

The selection of the various resins, charge adjuvants and charge director(s) provides the ability to control the charge of the dual color ink disclosed herein. This control enables one to formulate the ink to have specific electronic activity in defined conditions. High levels of charging can be achieved, which results in high switching speed (e.g., >5×10$^{-5}$) when the ink is used, for example, in a display device. In one example, the dual color electronically addressable ink is used in a pixelated display. Each pixel of the display may include the dual color ink (i.e., condensed color in each pixel), which enhances the color depth and simplifies the display design.

Some suitable displays for use with the dual color ink disclosed herein are discussed in U.S. patent application Ser. No. 12/815,811, entitled "Display Element", filed Jun. 15, 2010. Examples of the display and its various components, including the dual color electronic ink disclosed herein, are described in reference to the figures.

Referring now to FIG. 1, a cross-sectional view of one pixel 10 of a display is illustrated. The display includes transparent substrates 12, 14. Examples of suitable transparent substrate materials include plastic (e.g., polyethylene terephthalate (PET), polyethersulfone (PES), polyethylene naphthalate (PEN), etc.)), glass, or another suitable optically clear/transparent material. The transparent substrates 12, 14 are separated by an electrically insulating material that is designed/configured such that it defines side walls 16, 18 of the different pixels 10 of the display.

Each pixel 10 includes interdigitated electrodes 20, 22. The first electrode 20 includes a plurality of conductive lines $L_{20}$ that are interdigitated with the plurality of conductive lines $L_{22}$ of the second electrode 22. Examples of suitable materials for the interdigitated electrodes 20, 22 include any suitable conductor, such as a metal, silver nanowires, or carbon nanotubes.

Figure 3:
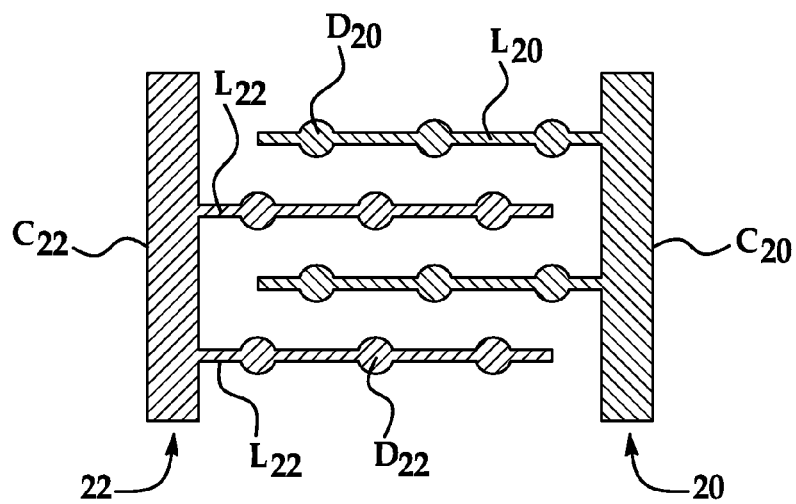
FIG. 3 is a top view of an example of interdigitated electrodes that may be used in examples of the displays disclosed herein.

A top view of one example of the interdigitated electrodes 20, 22 is shown in FIG. 3. Each electrode 20, 22 includes the respective conductive lines $L_{20}$, $L_{22}$ coupled to a respective common contact region $C_{20}$, $C_{22}$. In this example, the conductive lines $L_{20}$, $L_{22}$ include dot regions $D_{20}$, $D_{22}$ separated by portions of the lines $L_{20}$, $L_{22}$. It is to be understood however, that the dot regions $D_{20}$, $D_{22}$ may be excluded. As illustrated, the common contact region $C_{20}$ is parallel and opposite to common contact region $C_{22}$. The conductive lines $L_{20}$, $L_{22}$ are interdigitated. In this example, the respective dot regions $D_{20}$, $D_{22}$ of adjacent conductive lines $L_{20}$, $L_{22}$ are aligned with one another, while the dot regions $D_{20}$ of conductive lines $L_{20}$ are offset from dot regions $D_{22}$ of conductive lines $L_{22}$. In other examples, the dot regions $D_{20}$ of conductive lines $L_{20}$ are aligned with dot regions $D_{22}$ of conductive lines $L_{22}$. The common contact region $C_{20}$ and conductive lines $L_{20}$ are used to control the movement of either pigment-loaded acidic or basic resin particles of the dual color ink, and the common contact region $C_{22}$ and conductive lines $L_{22}$ are used to control the movement of the other of pigment-loaded basic or acidic resin particles of the dual color ink.

While a square lattice is shown, it is to be understood that the electrodes 20, 22 may be configured as a hexagonal lattice. Any other lattice geometry can be used so long as the geometry meets the clear aperture requirement and controls electrokinetic flow of the charged pigment-loaded resin particles for desirable electronic ink performance. It is to be understood that the electrode 20, 22 geometries may be optimized for a given electro-convective principle to provide switching and compaction for both pigment-loaded resin particles of the dual color ink.

Referring back to FIG. 1, the interdigitated electrodes 20, 22 are formed on the substrate 12. A dielectric layer 24 is formed over the electrodes 20, 22 and recesses 26 are formed so that surfaces of each of the electrodes 20, 22 are exposed. The recess 26 pattern may, in one example, correspond with the dot regions $D_{20}$, $D_{22}$ of the electrodes 20, 22. The recesses 23 allow the charged pigment-loaded basic or acidic resin particles to compact therein in response to a suitable bias being applied to the electrodes 20 and 28 or 22 and 28. As shown in FIG. 1, the dielectric layer 24 may be patterned so that the electrodes 20 and 22 are exposed at each of the recesses 26. Examples of materials suitable for the dielectric layer 24 include some UV curable resins, photoimagable resins, other plastics, and various oxides (e.g., hafnium oxide, $HfO_2$).

In another example that is not shown, the dielectric layer 24 is patterned to be thin enough at each of the recesses 26 so that the recesses 26 are electrically active. In other words, a thin portion of the dielectric layer 24 remains in the recesses 26 so long as the electrodes 20 and 22 are electrically coupled to the dual color ink (present in the display cell 30) at the recesses 26. In this example, the thicker portion of the dielectric layer 24 (i.e., where recesses 26 are not formed) acts as an insulator between the electrodes 20 and 22 and the dual color ink.

The display pixel 10 also includes a blanket electrode 28 established adjacent to the substrate 14. This electrode 28 is transparent. Examples of suitable transparent electrode materials include single wall or multi-wall carbon nanotube layers, silver nanowires, transparent conducting oxides (such as ITO (Indium Tin Oxide)), or transparent conducting polymers (such as PEDOT (poly 3,4-ethylenedioxythiophene) or polyethylenedioxythiophene polystyrenesulfonate (PEDOT: PSS)), or combinations thereof. Examples of these combinations include hybrid transparent electrodes, such as metal/polymer transparent electrodes, gold/ITO transparent electrodes, silver/ITO transparent electrodes, diamond/metal transparent electrodes, metal/dielectric transparent electrodes (e.g., LiF/Al), or the like. The electrode 28 is a grounded or reference electrode that operates in conjunction with the electrode 20 to move one of the colorants (e.g., the pigment-loaded basic resin particles) in the dual color ink, and that operates in conjunction with the electrode 22 to move the other of the colorants (e.g., the pigment-loaded acidic resin particles) in the dual color ink. The operation of the electrodes 20, 22 and 28 will be described further in reference to FIGS. 5A through 5D.

The area defined between the electrodes 20, 22 and 28 and the pixel walls 16, 18 is a display cell 30 that contains an example of the dual color ink disclosed herein. The pigment-loaded basic resin particles are labeled 34 and the pigment-loaded acidic resin particles are labeled 36.

Figure 2:
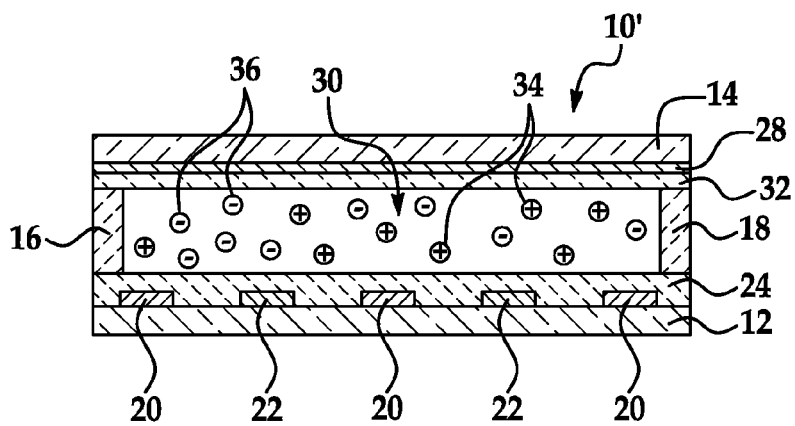
FIG. 2 is a cross-sectional view of another example of a display pixel including an example of a dual color electronically addressable ink.

FIG. 2 illustrates another example of the display pixel 10'. This example is similar to the example shown in FIG. 1, except that the dielectric layer 24 is established over the substrate 12 and the electrodes 20, 22, and a passivation layer 32 is positioned on the electrode 28 adjacent to the display cell 30.

The example of the dielectric layer 24 shown in FIG. 2 does not include recesses 56, but rather is thin enough over the electrodes 20, 22 to render the areas adjacent to the electrodes 20, 22 electrically active.

This example of the display pixel 10' also includes an additional passivation layer 32 positioned in contact with the electrode 28 and adjacent to the display cell 30. The passivation layer 32 may be any electrically insulating material that insulates the electrode 28 from the dual color ink in the display cell 30. In one example, the passivation layer 32 is a dielectric material, such as $HfO_2$. Other suitable passivation layer materials include reflective dielectric materials or optically clear or transparent dielectric materials.

Example dimensions of the components of the display pixel 10' shown in FIG. 2 include: about 100 nm for the passivation layer 32, the electrode 28, the substrates 12, 14 and the dielectric layer 22; 60 µm or smaller for the height of the display cell 30; about 10 µm for the overall width of the interdigitated electrodes 20, 22 (i.e., from one end to the other with all of the lines $L_{20}$, $L_{22}$ in between); from about 0.5 µm to about 1.5 µm for the width of each individual line $L_{20}$, $L_{22}$; and about 10 µm for the width of the pixel walls 16, 18. It is to be understood that these dimensions are illustrative and other dimensions may be used. For example, the overall width of the interdigitated electrodes 20, 22 and the width of the individual lines $L_{20}$, $L_{22}$ may be a few microns or less (e.g., in the sub-micron range). The dimensions may vary depending, at least in part, on the desired size of the pixel 10' and the desired size of the entire display. Furthermore, the figures illustrate exaggerated lines $L_{20}$, $L_{22}$ for understanding, but it is to be understood that the lines $L_{20}$, $L_{22}$ are generally much thinner than the gap between adjacent lines $L_{20}$, $L_{22}$ in order to provide good clear aperture and transparency.

Figure 4:
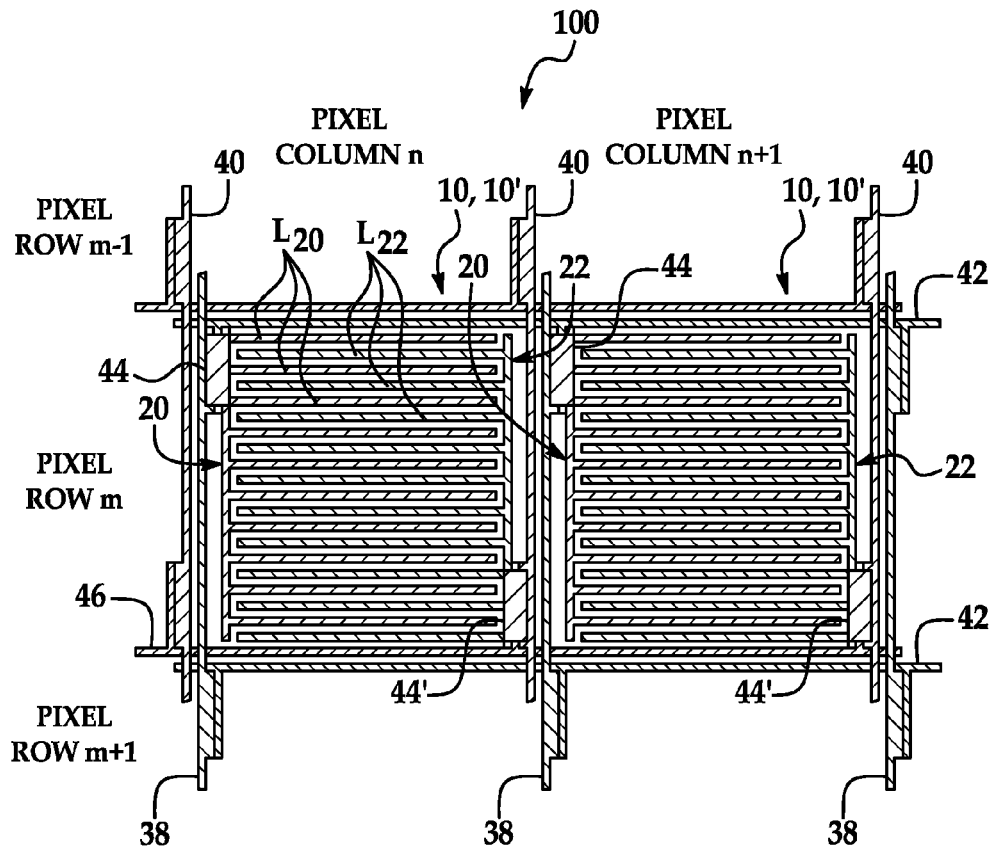
FIG. 4 is a top view of an example of a pixelated display.

Referring now to FIG. 4, a top view of a pixelated display 100 is depicted. This view illustrated the addressing circuitry for the electrodes 20, 22. This display 100 includes multiple rows m and columns n of pixels 10, 10', and the electrodes 20, 22 of two display pixels 10, 10' (located at m, n and m, n+1) are depicted. The electrode 20 of each pixel 10, 10' is electrically connected to respective first color data lines 38, respective first color control lines 42, and transistors or switches 44. Similarly, the electrode 22 of each pixel 10, 10' is electrically connected to respective second color data lines 40, respective second color control lines 46, and transistors or switches 44'. In one example, the data lines 38, 40 and control lines 42, 46 are conductive lines. In one example, the transistors or switches 44, 44' are thin film transistors.

As previously mentioned, the conductive lines $L_{20}$, $L_{22}$ of the first and second electrode 20, 22 are interdigitated, where the conductive lines $L_{20}$, $L_{22}$ are independently operable to control the movement of different pigment-loaded resin particles 34, 36. Each electrode 20 (and its conductive lines $L_{20}$) is individually activated through a respective transistor or switch 44 based on signals applied to data lines 38 and control lines 42. Each electrode 22 (and its conductive lines $L_{22}$) is individually activated through a respective transistor or switch 44' based on signals applied to data lines 40 and control lines 46. In this manner, each individual pigment-loaded resin particle 34, 36 of each individual pixel 10, 10' of the display 100 can be controlled to provide a desired image.

FIGS. 5A through 5D illustrate an example of the dual color ink within the display cell 30 of a pixel 10" in various operating states. Control of each pigment-loaded resin particle 34, 36 is given by a relative potential difference between the blanket electrode 28 and the respective electrodes 20, 22. In these figures, the positively charged pigment-loaded basic resin particles are labeled 34 and the negatively charged pigment-loaded acidic resin particles are labeled 36.

The display pixel 10" shown in these figures is similar to the display pixel 10 shown in FIG. 1, except this example also includes another dielectric layer 48 positioned between the substrate 12 and the interdigitated electrodes 20, 22. This dielectric layer 48 may be made up of any suitable dielectric material previously discussed.

Figure 5A:
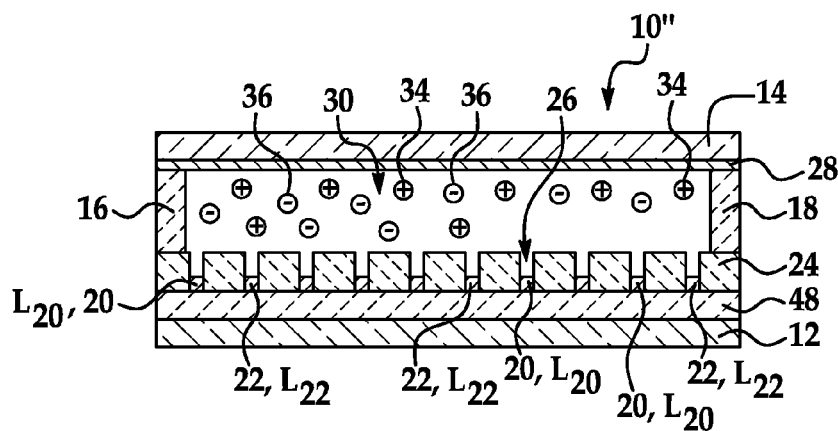
FIGS. 5A through 5D are cross-sectional views of still another example of a display pixel including an example of a dual color electronically addressable ink, each of the figures illustrating a different state of the display pixel.

FIG. 5A illustrates the fully spread state, where neither the pigment-loaded basic resin particles 34 nor the pigment-loaded acidic resin particles 36 are compacted near the electrodes 20, 22. In one example, the spread state can be achieved when no bias is applied. However, it can take some time to achieve the desired fully spread state with no bias. In another example, the spread state can be achieved when pulses are applied to first and second electrodes 20, 22 relative to a reference bias applied to electrode 28. The pulses may be used to control the spreading of the particles 34, 36 and to accelerate the process. The pulses applied to first electrode 20 spread negatively charged pigment-loaded acidic resin particles 36 within display cell 30. The pulses applied to second electrode 22 spread positively charged pigment-loaded basic resin particles 34 within display cell 30.

When the colorant particles 34, 36 are subtractive colorant particles and are spread in display cell 30, a black state or a combined subtractive color state may be achieved. For example, when cyan and yellow particles are spread (and a white reflector 20 is used), the display will appear green since red and blue colors are subtracted out. The amount of colorants 34 and/or 36 that are in the spread state can be controlled by either dynamic modulation of voltage pulse width at fixed amplitude, or dynamic modulation of voltage pulse amplitude at fixed pulse width, or both. Symmetric pulsing between attractive and repulsive potential allows uniform mixing (shown in FIG. 5A) while asymmetric pulsing between more attractive potential than repulsive will attract more particles 34 and/or 36 in the compacted state, thus providing gray scale (described further below). Since two colorants 34, 36 are included, it is to be understood that there are enough degrees of freedom with three electrodes to control each of the colorants 34, 36 independently. In one example to achieve the fully spread state shown in FIG. 5A, the electrode 28 may be held at 0V, while pulses of +20V and −20V are applied to electrode 20 and pulses of −20 V and +20 volts are applied to electrode 22.

As previously mentioned, the grey scale of the colorants 34 and/or 36 may be achieved by compacting some of the particles 34 and/or 36 while spreading others of the particles 34 and/or 36. It is to be understood that the amount of spreading of colorant particles 36 may be controlled based on the pulses to provide a desired gray scale for the colorant particles 36. Similarly, the amount of spreading of colorant particles 34 may also be controlled based on the pulses to provide a desired gray scale for the colorant particles 34. In order to show various color or full shades of color, desired amounts of the colorants 34 and/or 36 are spread. As such, independent control of colorants 34, 36 with various grey scale is desirable for achieving full color states.

Figure 5B:
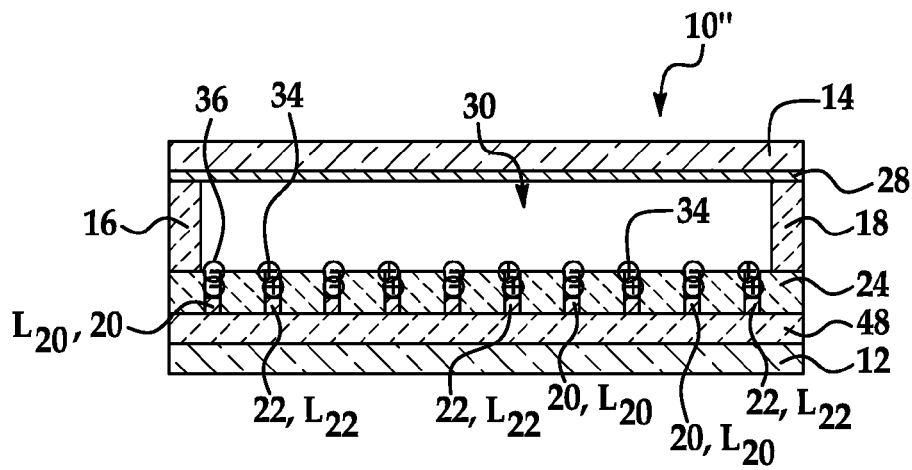

FIG. 5B illustrates the clear optical state, where the pigment-loaded basic resin particles 34 and the pigment-loaded acidic resin particles 36 are compacted near respective electrodes 22, 20. The pigment-loaded basic resin particles 34 are positively charged, the pigment-loaded acidic resin particles 36 are negatively charged, and each of the particles 34, 36 provides a different color. First electrode 20 is used to control the movement of colorant particles 36, and second electrode 22 is used to control the movement of colorant particles 34.

In the clear optical state, a positive bias is applied to first electrode 20 and a negative bias is applied to second electrode 22 relative to a reference bias applied to the blanket electrode 28. The positive bias applied to first electrode 20 attracts negatively charged pigment-loaded acidic resin particles 36 to compact on the surface of first electrode 20 in some of the recesses 26. The negative bias applied to second electrode 22 attracts positively charged pigment-loaded basic resin particles 34 to compact on the surface of second electrode 22 in other of the recesses 26. With colorant particles 34 and 36 compacted in respective recesses 26, the clear optical state is achieved. It is to be understood that the sizes of the components are exaggerated in these figures, and that the electrodes 20, 22 (including lines $L_{20}$, $L_{22}$), the gap between the lines $L_{20}$, $L_{22}$, the recesses 26, and the particle size are selected to achieve the desired clear aperture.

Figure 5C:
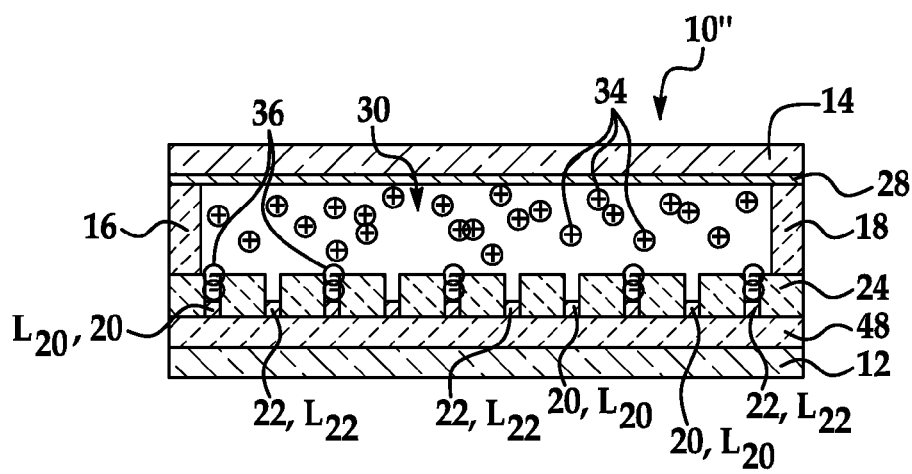

FIG. 5C illustrates the pigment-loaded basic resin particle color optical state. In this state, pulses are applied to second electrode 22 and a positive bias is applied to first electrode 20 relative to a reference bias applied to electrode 28. The pulses applied to second electrode 22 spread the positively charged pigment-loaded resin particles 34 within display cell 30. The amount of spreading of the colorant particles 34 is controlled based on the pulses to provide a desired gray scale for colorant particles 34. The positive bias applied to first electrode 20 attracts negatively charged pigment-loaded acidic resin particles 36 to compact on the surface of first electrode 20. With colorant particles 34 spread in display cell 30 and colorant particles 36 compacted in recesses 26 adjacent to the first electrode 20, a color optical state having the color of the pigment-loaded basic resin particles 34 is achieved.

The voltages that are applied may vary depending, at least in part, on the pigment-loaded resin particles that are used and the desired color. The following are several examples of how the pigment-loaded basic resin particle color optical state can be achieved. In one example, the electrode 28 may be held at 0V while a steady +20 V is applied to electrode 20 and pulses of −20V and +5V are applied to electrode 22. The pulses are applied for 30 ms each. In another example, the electrode 28 may be held at +10V while a steady +20 V is applied to electrode 20 and pulses of −20V and +5V are applied to electrode 22. The pulses are applied for 30 ms each. In still another example, the electrode 28 may be held at −10V while a steady +20 V is applied to electrode 20 and pulses of −20V and +5V are applied to electrode 22. The pulses are applied for 30 ms each. Each of these examples results in compaction of the pigment-loaded acidic resin particles 36 and spreading of the pigment-loaded basic resin particles 34. More particularly, each of these examples provides positive net bias to the electrode 20 while resulting in various potential to the electrode 22, which produces various grey levels. It is to be understood that appropriate voltage levels and pulse width combinations may be used to produce desired levels of grey for each of the colorant particles 34, 36, and thus desired color.

Figure 5D:
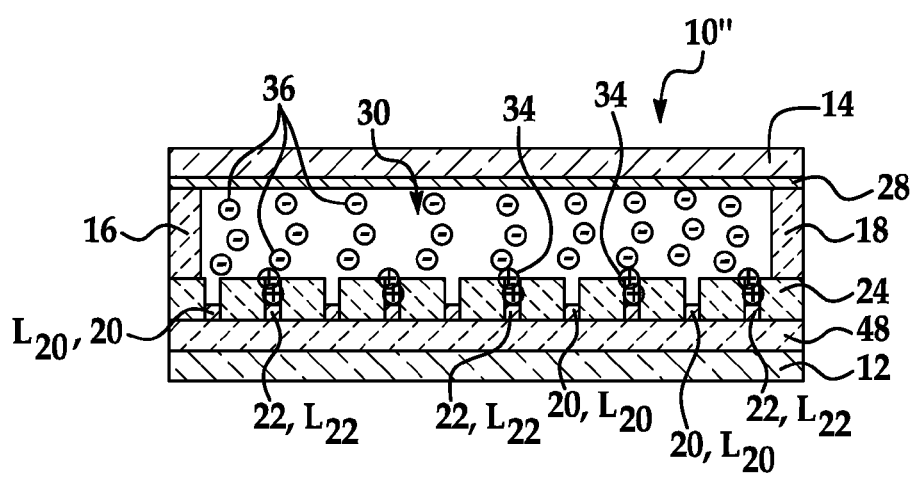

FIG. 5D illustrates the pigment-loaded acidic resin particle color optical state. In this state, pulses are applied to first electrode 20 and a negative bias is applied to second electrode 22 relative to a reference bias applied to electrode 28. The pulses applied to first electrode 20 spread the negatively charged pigment-loaded resin particles 36 within display cell 30. The amount of spreading of colorant particles 36 is controlled based on the pulses to provide a desired gray scale for colorant particles 36. The negative bias applied to second electrode 22 attracts positively charged pigment-loaded basic resin particles 34 to compact on the surface of second electrode 22. With colorant particles 36 spread in display cell 30 and colorant particles 34 compacted in recesses 26 adjacent the second electrode 22, a color optical state having the color of the pigment-loaded acidic resin particles 36 is achieved.

The voltages that are applied may vary depending, at least in part, on the pigment-loaded resin particles that are used and the desired color. The following are several examples of how the pigment-loaded acidic resin particle color optical state can be achieved. In one example, the electrode 28 may be held at 0V while a steady −20 V is applied to electrode 22 and pulses of 20V and −5V are applied to electrode 20. The pulses are applied for 30 ms each. In another example, the electrode 28 may be held at +10V while a steady −20 V is applied to electrode 22 and pulses of +20V and −5V are applied to electrode 20. The pulses are applied for 30 ms each. In still another example, the electrode 28 may be held at −10V while a steady −20 V is applied to electrode 22 and pulses of +20V and −5V are applied to electrode 20. The pulses are applied for 30 ms each. Each of these examples results in compaction of the pigment-loaded basic resin particles 34 and spreading of the pigment-loaded acidic resin particles 36. More particularly, each of these examples provides negative net bias to the electrode 22 while resulting in various potential to the electrode 20, which produces various grey levels. As previously mentioned, appropriate voltage levels and pulse width combinations may be used to produce desired levels of grey for each of the colorant particles 34, 36, and thus desired color.

The following example illustrates transitioning the display between the clear optical state and a black state. In this example, the positively charged particles 34 are magenta pigment-loaded resin particles and the negatively charged particles 36 are black pigment-loaded resin particles. To achieve the clear optical state, −15V may be applied to the second electrode 22 while +20V is applied to first electrode 20, where both voltages are relative to the electrode 28. The positive bias attracts the negatively charged particles 36, while the negative bias attracts the positively charged particles 34. When it is desirable to achieve the black state, the holding voltage applied to the second electrode 22 may be −7V while the voltage applied to the first electrode 20 may be changed to −2V. This will release at least some of the negatively charged black pigment-loaded resin particles into the display cell 30. When it is desirable to spread the magenta pigment-loaded resin particles, a bias condition that is opposite to the one used for spreading the black pigment-loaded resin particles may be applied. Various configurations of the relative bias conditions among the electrode 20, 22, 28 may be used to achieve, for example, a color state after the clear optical state.

The examples of the display that include the dual color ink disclosed herein exhibit bi-stability. Displays that are bi-stable can maintain their states for a finite amount of time without power. As such, biases may be applied to achieve a desired state (e.g., full color state, pigment-loaded acidic resin particle color optical state, pigment-loaded basic resin particle color optical state), and then the biases may be removed or turned off and the particular state(s) will be maintained. In some of the examples disclosed herein, the binary colors are able to maintain their states under zero bias for a few hours to days. Bi-stability advantageously minimizes the energy used to maintain a particular state. This feature is believed to enhance operating reliability by orders of magnitude and also extend the device life time.

Figure 6:
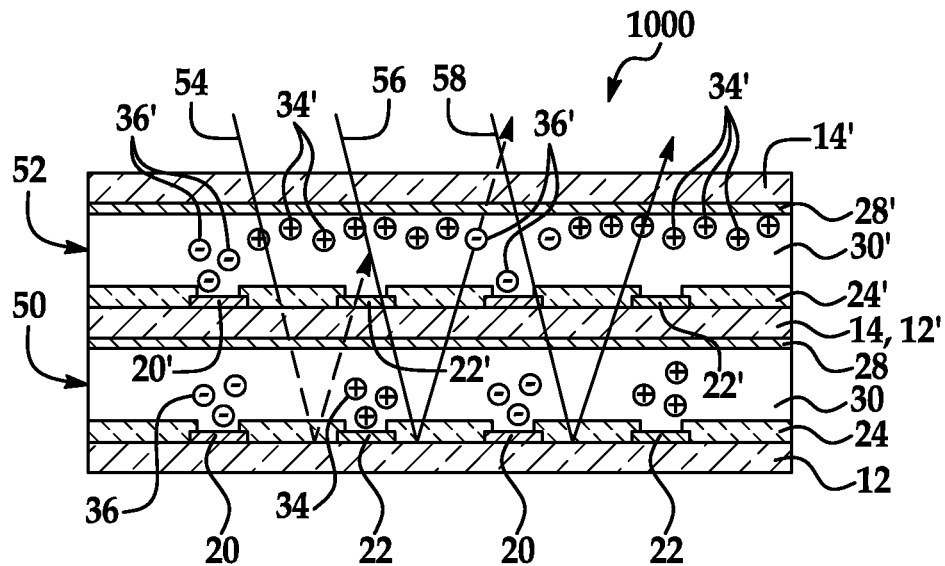
FIG. 6 is a cross-sectional view of an example of a display pixel including multiple layers.
Figure 7:
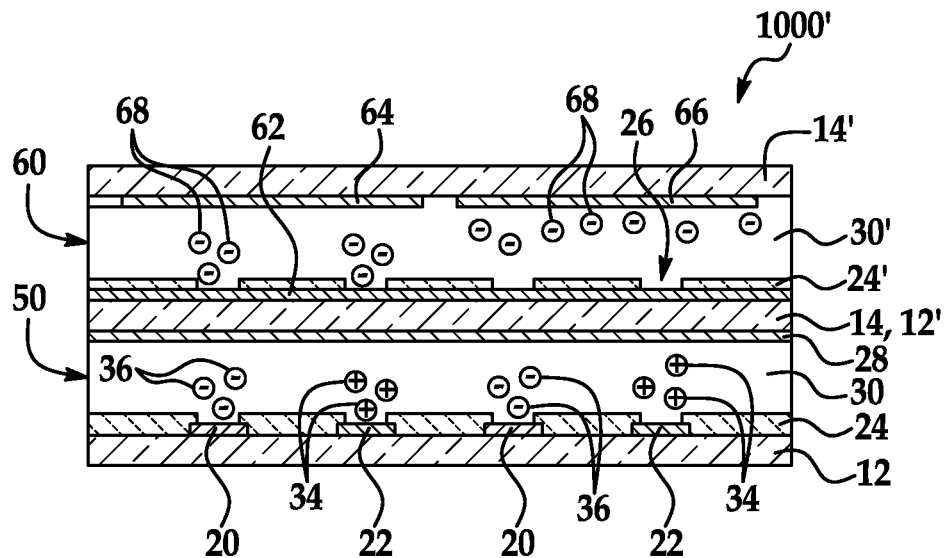
FIG. 7 is a cross-sectional view of another example of a display pixel including multiple layers.

The displays disclosed herein may be multi-layered systems 1000, 1000', such as those shown in FIGS. 6 and 7. A single pixel of the multi-layered systems 1000, 1000' is shown in these figures, and it is noted that the pixel walls 16, 18 are not shown.

FIG. 6 illustrates a cross-sectional view of one example a full color multi-layered pixel 1000. This pixel 1000 includes a dual layer stack including display element layers 50 and 52. Each layer 50 and 52 is similar to the single pixel 10 shown and described in reference to FIG. 1. In this example, the top substrate 14 of the first layer 50 is also the bottom substrate 12' of the second layer 52. The substrate 12 in this example may be reflective or may include a reflective layer (not shown). In one example, the reflective layer is white.

In this example, layer 50 includes a first dual color ink (e.g., positively charged magenta and negatively charged black), and layer 52 includes a second dual color ink (e.g., positively charged cyan and negatively charged yellow). This provides a full color (CMYK) display with a reduced number of backplanes compared to a single color ink in each layer, which will require three or more backplanes to produce full color.

The bias applied to electrodes 20 and 22 of the first layer 50 and to the electrodes 20' and 22' of the second layer 52 can be individually controlled as previously described and illustrated with reference to FIGS. 5A through 5D. By controlling the bias applied to the electrodes 20, 22, 20', 22', the movement of the respective pigment-loaded resin particles 34, 36, 34', 36' of the first and second dual color inks of the multi-layered system 1000 can be controlled to display desired colors, such as red (labeled 54), blue (labeled 56), and green (labeled 58) from appropriate combinations of subtractive colorant particles, such as cyan, magenta, and yellow.

FIG. 7 illustrates a cross-sectional view of another example a full color multi-layered pixel 1000'. This pixel 1000' includes a dual layer stack including display element layers 50 and 60. The layer 50 is similar to the single pixel 10 shown and described in reference to FIG. 1. In this example, layer 50 includes the dual color ink disclosed herein.

The top substrate 14 of the first layer 50 is also the bottom substrate 12' of the second layer 60. The substrate 12 in this example may be reflective or may include a reflective layer (not shown). In one example, the reflective layer is white.

The second layer 60 includes a single color ink (e.g., including negatively charged particles 68 or positively charged particles). Since a single color ink is utilized, the electrode scheme in this layer 60 can be different from the electrode scheme used when the dual color ink is included. In this example, the layer 60 includes an electrode 62 positioned adjacent to the substrate 14, 12'. A dielectric layer 24' is positioned over the electrode 62 to form recesses 26 so that portions of the electrode 62 are exposed, or at least are electrically active. The electrode 62 is a blanket electrode. The layer 60 also includes electrodes 64, 66 positioned adjacent to the substrate 14' and the display cell 30', and opposed to the electrode 62. It is to be understood that in one example, each of these electrodes 62, 64, 66 is a transparent electrode.

The blanket electrode 62 with the recessed dielectric layer 24' can provide electrokinetic control of particles 68 to compact or spread them, while a patterned electrode (e.g., having a finger-like configuration) with a blanket transparent electrode on the opposite side can provide electrophoretic control of the particles 68 (where the charged particles follow an electric field to compact or spread). Either configuration may be used for the single color.

The operation of the layer 60 will now be described. Both the clear optical state and the colored state for the layer 60 are shown in FIG. 7. To provide the clear optical state, a negative bias is applied to the electrode 64 relative to the reference bias applied to the electrode 62. With the negative bias applied to the electrode 64, negatively charged colorant particles 68 are attracted by the electrode 68 to compact in recesses 26. To provide the color or spread optical state as illustrated in another portion of display cell 30', a positive bias is applied to the electrode 66 relative to the reference bias applied to the electrode 62. With the positive bias applied to the electrode 66, the negatively charged colorant particles 68 are attracted by and spread over the electrode 66 or across the gap between the two electrodes, depending upon the voltage condition applies. The electrodes 64, 66 may be operated to provide a fully clear state, a fully colored state, or both states as shown in FIG. 7.

The layer 60 can be independently controlled from layer 50, and layer 50 may be controlled as previously described.

It is to be understood that the ranges provided herein include the stated range and any value or sub-range within the stated range. For example, a size ranging from about 1 nm to about 1 μm should be interpreted to include not only the explicitly recited amount limits of about 1 nm to about 1 μm, but also to include individual amounts, such as 10 nm, 50 nm, 220 nm, etc., and sub-ranges, such as 50 nm to 500 nm, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:

1. A dual color electronically addressable ink, comprising:
    a positively charged ink, including:
        a non-polar carrier fluid;
        pigment-loaded basic resin particles having a first color; and
        an acceptor charge adjuvant;
    a negatively charged ink, including:
        the non-polar carrier fluid;
        pigment-loaded acidic resin particles having a second color that is different from the first color; and
        a donor charge adjuvant; and
    at least one charge director.

2. The dual color electronically addressable ink as defined in claim 1 wherein the at least one charge director includes a negative charge director and a positive charge director.

3. The dual color electronically addressable ink as defined in claim 2 wherein:
    the negative charge director is chosen from: an organic multi-valent metal surfactant salt; a polyisobutylene succinimide polyamine; metal salts of fatty acids; metal salts of sulfo-succinates; metal salts of oxyphosphates; metal salts of alkyl-benzenesulfonic acid; metal salts of aromatic carboxylic acids or sulfonic acids; polyoxyethylated alkylamines; lecithin; polyvinyl-pyrrolidone; organic acid esters of polyvalent alcohols; sulfosuccinic acid, ditridecyl ester metal salt; a material including (a) nanoparticles of a simple salt and (b) a sulfosuccinate salt of the general formula $MA_n$, wherein M is a metal, n is the valence of M, and A is an ion of the general formula $R_1$—O—C(O)$CH_2$CH($SO_3^-$)C(O)—O—$R_2$], (I) wherein each of $R_1$ and $R_2$ is an alkyl group; and a weakly associating, charged functional group and a strongly chelating, neutrally charged, molecule; and
    the positive charge director is an organic multi-valent metal surfactant salt or a polyisobutylene succinimide polyamine.

4. The dual color electronically addressable ink as defined in claim 1 including a predetermined composition of negative and positive charge directors to achieve a balance of positive and negative charges.

5. The dual color electronically addressable ink as defined in claim 1 wherein the at least one charge director is a single charge director chosen from a polyisobutylene succinimide polyamine.

6. The dual color electronically addressable ink as defined in claim 5 wherein the single charge director is present in an amount ranging from about 1% to about 500% based upon a total percentage of solids in the dual color electronically addressable ink.

7. The dual color electronically addressable ink as defined in claim 1 wherein each of the pigment-loaded basic resin particles and the pigment-loaded acidic resin particles has a diameter that is equal to or less than 1 micron.

8. The dual color electronically addressable ink as defined in claim 1 wherein:
    the pigment-loaded basic resin particles include pigment particles loaded onto a basic resin chosen from polyamines; polyamides; a vinyl pyrrolidone/triacontene copolymer; homopolymers or copolymers of polyvinyl pyrrolidone; homopolymers or copolymers of polyvinyl pyridine; amino terminated polyacrylates; polyethylene imine; polyethylene oxide diamine terminated; polypropylene oxide, monoamine or di-amine terminated; polydimethyl siloxane, diamino propyl terminated; ethylene/butylene copolymers, mono and dihydroxy terminated; and hydroxylethyl cellulose;
    the acceptor charge adjuvant has a formula $X_n(R^a)(R^b)$ or $X_n(R^a)(R^b)(COOH)$ wherein X is F, Cl, Br, $NO_2$ or CN; $R^a$ is a substituted or unsubstituted alkyl group; $R^b$ is Sb, P, Ti, Sn, B, Al, Zn, a phenol or a benzene group; and n is 1, 2, 3, 4 or 5;
    the pigment-loaded acidic resin particles include pigment particles loaded onto an acidic resin chosen from a copolymer of polyethylene grafted with maleic anhydride and a polyethylene-based ionomer; and
    the donor charge adjuvant is chosen from metallic soaps containing a metal and a ligand.

9. The dual color electronically addressable ink as defined in claim 1 wherein the ink includes from about 0.1 wt % to about 10 wt % of the positively charged ink and from about 0.1 wt % to about 10 wt % of the negatively charged ink.

10. A multi-layer system, comprising:
    a first layer including the dual color electronically addressable ink as defined in claim 1; and
    a second layer including the dual color electronically addressable ink as defined in claim 1, wherein the first and second colors in the first layer are different than the first and second colors in the second layer.

11. A multi-layer system, comprising:
    a first layer including the dual color electronically addressable ink as defined in claim 1; and a second layer including a single color electronically addressable ink, wherein the first and second colors of the first layer are different than the single color electronically addressable ink of the second layer.

12. An electronic display, comprising:
a first electrode including a plurality of first conductive lines;
a second electrode including a plurality of second conductive lines interdigitated with the plurality of first conductive lines;
a third electrode;
a display cell defined between the third electrode and each of the first and second electrodes; and
the dual color electronically addressable ink as defined in claim 1 deposited in the display cell.

13. The electronic display as defined in claim 12 wherein the display exhibits bi-stability.

14. The electronic display as defined in claim 12, further comprising a passivation layer positioned between each of the first electrode, the second electrode, the third electrode and the display cell.

15. The electronic display as defined in claim 12 wherein a grey scale of the display cell is controlled by dynamic modulation of any of a voltage amplitude or a voltage pulse width applied to any of the first electrode or the second electrode.

16. A method for making a dual color electronically addressable ink, comprising:
selecting a positively charged ink, including:
a non-polar carrier fluid;
pigment-loaded basic resin particles having a first color; and
an acceptor charge adjuvant;
selecting a negatively charged ink, including:
the non-polar carrier fluid;
pigment-loaded acidic resin particles having a second color that is different from the first color; and
a donor charge adjuvant;
mixing respective amounts of the positively charged ink and the negatively charged ink together to form a mixture; and
adding an amount at least one charge director to the mixture to form the dual color electronically addressable ink.

* * * * *

UNITED STATES PATENT AND TRADEMARK OFFICE
CERTIFICATE OF CORRECTION

PATENT NO. : 8,514,481 B2
APPLICATION NO. : 13/181479
DATED : August 20, 2013
INVENTOR(S) : Jong-Souk Yeo et al.

It is certified that error appears in the above-identified patent and that said Letters Patent is hereby corrected as shown below:

In the Claims

In column 18, line 5, in Claim 3, delete "$R_2$]," and insert -- $R_2$, --, therefor.

In column 18, line 42, in Claim 8, delete "hydroxylethyl" and insert -- hydroxyl ethyl --, therefor.

Signed and Sealed this
Thirty-first Day of December, 2013

Margaret A. Focarino
*Commissioner for Patents of the United States Patent and Trademark Office*